(12) United States Patent
Aoki et al.

(10) Patent No.: US 7,234,107 B1
(45) Date of Patent: Jun. 19, 2007

(54) SYSTEM FOR CUSTOMIZING WEB PAGE (75) Inventors: Yoshinori Aoki, Yokohama (JP);
Amane Nakajima, Machida (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/488,511

(22) Filed: Jan. 20, 2000

(30) Foreign Application Priority Data

Jan. 26, 1999 (JP) ................................. 11-016969

(51) Int. Cl.
*G06N 3/00* (2006.01)
(52) U.S. Cl. .................................................... 715/513
(58) Field of Classification Search ............. 715/501.1, 715/526, 522, 513, 523, 515, 516, 500.1, 715/517, 530; 707/100, 102, 203; 717/100; 709/218, 203
See application file for complete search history.

(56) References Cited

U.S. PATENT DOCUMENTS

| | | | | |
|---|---|---|---|---|
| 5,572,643 | A  * | 11/1996 | Judson | 709/218 |
| 5,894,554 | A  * | 4/1999 | Lowery et al. | 709/203 |
| 6,125,385 | A  * | 9/2000 | Wies et al. | 709/203 |
| 6,161,112 | A  * | 12/2000 | Cragun et al. | 715/501.1 |
| 6,185,587 | B1 * | 2/2001 | Bernardo et al. | 707/513 |
| 6,209,007 | B1 * | 3/2001 | Kelley et al. | 707/513 |
| 6,226,648 | B1 * | 5/2001 | Appleman et al. | 707/102 |
| 6,278,448 | B1 * | 8/2001 | Brown et al. | 345/866 |
| 6,408,311 | B1 * | 6/2002 | Baisley et al. | 707/203 |
| 6,442,577 | B1 * | 8/2002 | Britton et al. | 707/513 |
| 6,601,232 | B1 * | 7/2003 | Burba et al. | 717/100 |

FOREIGN PATENT DOCUMENTS

EP 0 878 768 A2 11/1998
JP 10-171590 6/1998

OTHER PUBLICATIONS

Lemay, Laura, "Microsoft(r) FrontPage(tm) 98," 1997, Sams.net Publishing(tm), pp. 37-78.*

* cited by examiner

*Primary Examiner*—Stephen Hong
*Assistant Examiner*—Kyle Stork
(74) *Attorney, Agent, or Firm*—Scully, Scott, Murphy & Presser, P.C.; Mark Wardas (57) ABSTRACT

A method and a system for customizing a Web page includes the capability of adding all types of objects describable in HTML such as text, an image, a program, a hyperlink, a table and an applet. A web page is customized by first requesting the page to be customized from a user's computer via a proxy server. The proxy server embeds a program for customization in the requested web page and the web page with the embedded program is then displayed by a browser of a computer. The program causes the display of a control panel, and the Web page may be customized according to a customizing operation initiated by a user via the control panel. The data comprising the customization is stored and may be subsequently accessed to customize the page when the Web page is again requested by that user.

18 Claims, 6 Drawing Sheets

SYSTEM FOR CUSTOMIZING WEB PAGE

BACKGROUND OF THE INVENTION

1. Technical Field

The present invention relates to customization of a Web page, particularly to a method and a system for customizing a Web page which allows a user to add and erase an object on a Web page and to change an attribute of an object. Meanwhile, in this specification, addition/erasure of an object on a Web page and change of an attribute of an object are called customization. Moreover, an individual operation for customizing, addition of an object for instance, is called a customizing operation. A "user" is used as a word as opposed to an "author" who creates and manages an HTML document, and it means all the people who browse an HTML document (including end users and network administrators).

2. Prior Art

If a new hyperlink is to be added to an existing Web page, or if a link target of an existing hyperlink is to be changed, it is necessary to edit an HTML (Hyper Text Markup Language) file. It is also necessary to edit an HTML file likewise when an object such as text, an image, a table or a Java applet is added or erased on a Web page. However, since only a creator (an author) of an HTML file is usually authorized to edit the file, a user has not ben allowed to add various information nor change a link target of a hyperlink. It is possible to save HTML file on a hard disk by utilizing Web page capturing software and manually edit so as to modify a Web page. However, it requires high-level knowledge such as HTML and CS (Cascading Style Sheet), and in addition, modification cannot be shared with other users since the modified page is saved on a local disk. Even if the modified HTML file is saved on a Web server, a new HTML file must be created each time it is modified so that the user needs to remember a URL for each modified HTML file in addition to an original URL, an thus administration of URLs becomes complicated.

For instance, a community supporting system can be constructed with NetCollage of NEC. It is capable of pasting text, an image, a program and an ink annotation directly on a Web page and also sharing the pasted objects with other users. Added objects are placed on a layer (a layer by an original technology, and not a layer of DynamicHTML), and it is possible to set what should be displayed to which uer by having access control on each layer. However, it is necessary to use a dedicated browser. Addable objects are only text, an image, a program and an ink annotation. It is not capable of changing an attribute of an object or erasing an existing object. It is also necessary to install the program on a client machine in advance.

Therefore, an object of the present invention is to provide a method and a system for customizing a Web page which does not require use of a dedicated browser.

Another object is to provide a method and a system for customizing a Web page which are capable of adding all types of objects describable in HTML such as text, an image, a program, a hyperlink, a table and a Java applet.

A further object is to provide a method and a system for customizing a Web page which are capable of changing an attribute of an object and erasing an existing object.

A still further object is to provide a method and a system for customizing a Web page which do not need to be installed on a client machine in advance.

A still further object is to provide a method and a system for customizing a Web page which allow addition, erasure and modification to be shared in a group.

A still further object is to provide a method and a system for customizing a Web page which allow a customized Web page to appear only by specifying an original URL.

SUMMARY OF THE INVENTION

To achieve the above-mentioned objects, by using at least one computer on which a browser for browsing a Web page runs, a Web page is customized by requesting a Web page to be customized, receiving a requested Web page in which a program for customizing a page is embedded, displaying the received Web page by a browser, having the program display a control panel for a customizing operation, and customizing a Web page according to a customizing operation by a user using the control panel. For instance, if embedding of the program is done by a proxy server, it is organized so that a page is customized by requesting a page to be customized form a user's computer via a proxy server, having the proxy server embed a program for customization in the requested page, displaying the page in which the program is embedded by a browser of a computer, having the program display a control panel for a customizing operation, and customizing a page according to a customizing operation by a user using the control panel. And the data on the customizing operation is stored on the server. Moreover, a program for customization can be a program embedded in a locally (such as a hard disk, a diskette or a CD-ROM) stored Web page.

Cooperative work for editing a page is performed by first requesting a page from another computer via a proxy server (hereafter, a "server"), having the server embed a program in the requested page, displaying the page in which the program is embedded by a browser of a computer, having the program send to a server information of the page, receiving data of a customizing operation already performed on the page, and having the program, based on this data, reflect a customizing operation performed on the page on a browser. And the program organizes it so that a control panel for a customizing operation is displayed, and from another computer, a page is further customized according to a customizing operation by a user using the control panel. Meanwhile, it is preferable to organize it so that the program to be embedded is not dependent on any operating system nor application and the system immediately reflects a result of a customizing operation on a browser.

Data on customization is information of a customizing operation on a Web page and is managed separately from an original HTML file. Information of a customizing operation is retained together with a customizing user's ID, a URL of a customized Web page, and data on access rights to be managed for each customizing operation. A customizing operation is dynamically reflected after displaying an original Web page. An object to be added to a Web page is also described as HTML elements. A program which runs on a client machine is described in Java and JavaScript.

To customize a Web page on a browser, functions of DynamicHTML (hereafter, a "DHTML") are used. When saving data of customizing operation, information of added/changed objects such as a URL of the Web page and a position of an added object in a window is recorded and saved on a local disk or server. In the case of saving it on a server, it is possible to add information of whether or not to show it to other users so as to control to whom it is displayed. Meanwhile, access to a local disk or a server is performed by a Java applet. To see a customized Web page, the Web page is loaded and then the dynamically custom izing operations are reflected by a Java applet. To reflect customizing operations, functions of DHTML are used. Thus, it is also possible to dynamically switch which customizing operation to be reflected on a Web page.

As it is organized in this way, it becomes possible for a user to freely add on an existing Web page text, a hyperlink, an image, a table and a Java applet and the like (hereafter, "objects") without changing an original HTML file. The added objects may also be moved or erased later. Without changing an original HTML file, a user may change an attribute of an object of an existing Web page. An attribute of an object referred to here is a link target of a hyperlink, a font or a color of text. Without changing an original HTML file, a user may erase an object on an existing Web page. Since information of a URL and changes made (for instance, types and positions of added objects) is saved, it is possible to display likewise later when the page is seen. Since addition and change of an object is managed separately from an original HTML file, other users are not affected. Namely, other users can see an unchanged original Web page. It is also possible, as for users in a group, to control what change is displayed depending on a user. As it is not editing an original HTML file but dynamically reflecting a customizing operation after displaying an original Web page, it becomes possible to dynamically switch whether to reflect it on a page for each customizing operation. Changes made can be controlled entirely or one by one as to display or non display. Accordingly, unlike a case of changing an original, views of both before and after a change may be provided. Since it is entirely described in Java and JavaScript, it is no longer necessary to install software other than a browser on a client machine.

It is also possible to share objects such as added text and images among members of a group so as to use a Web page as a bulletin board. It is also possible to control what change is displayed depending on a user. Since control of a hyperlink (addition, erasure, and change of a link target) can be implemented, it becomes possible for an administrator to control a link to an undesired page.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENTS OF THE INVENTION

Figure 1:
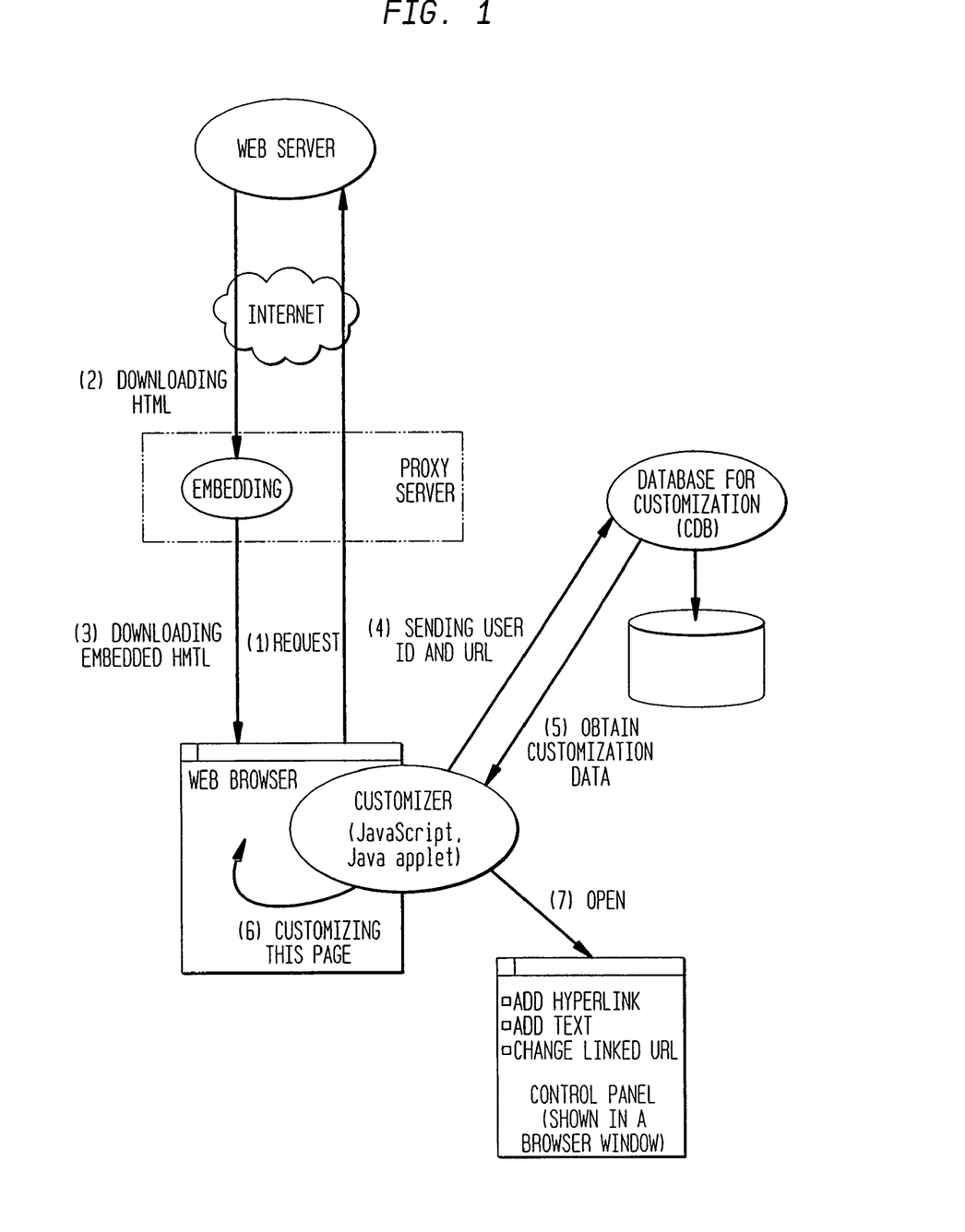
FIG. 1 is a drawing showing an overview of a system for customizing a page of the present invention.

FIG. 1 shows an overview of a system for customizing a page of the present invention.

<1> Downloading a Web page into a browser

First, when a user downloads contents into a browser in (1) of FIG. 1, a customizer (a program for customization) is embedded in HTML by a proxy server in (2) to (3) of FIG. 1. Meanwhile, a customizer should preferably be a program written in Java and JavaScript.

<2> Reflecting customizing operations already performed on the Web page

In (4) of FIG. 1, a customizer obtains a user ID and sends the user ID and a current URL to a database for customization. To obtain a user ID, there are methods such as using a cookie or using a control panel or the like to have a user directly enter an ID and a password (there may also be other methods, bur they are not described in detail here since how to obtain a user ID is not the essence of the present invention). Moreover, in an environment where it is used not only by a group but by an individual, it is not necessary to obtain a user ID> In (5) of FIG. 1, out of the entire customizing operations performed to the URL, the customizer receives from the database all of those whose access rights belong to the user. In (6) of FIG. 1, the customizer utilizes DHTML functions and customizes a Web page based on the received customizing operations. At this time, it is also possible to present a list of customizing operations to the user to select which operation to be reflected.

<3> A new customizing operation by the user on a browser

In (7) of FIG. 1, the customizer displays the control panel and newly accepts a customizing operation from a user. In (6) of FIG. 1, the customizing operation designated by the user through the control panel is immediately reflected by the customizer on the browser. Moreover, the customizer stores information of customizing operations performed by the user in a database for customization in a timely manner. Data to be stored in the database includes an ID of the user who performed customization, a URL of the customized page, setting of access rights (to whom the operation is shown) and contents of the customizing operation and the like.

Figure 2:
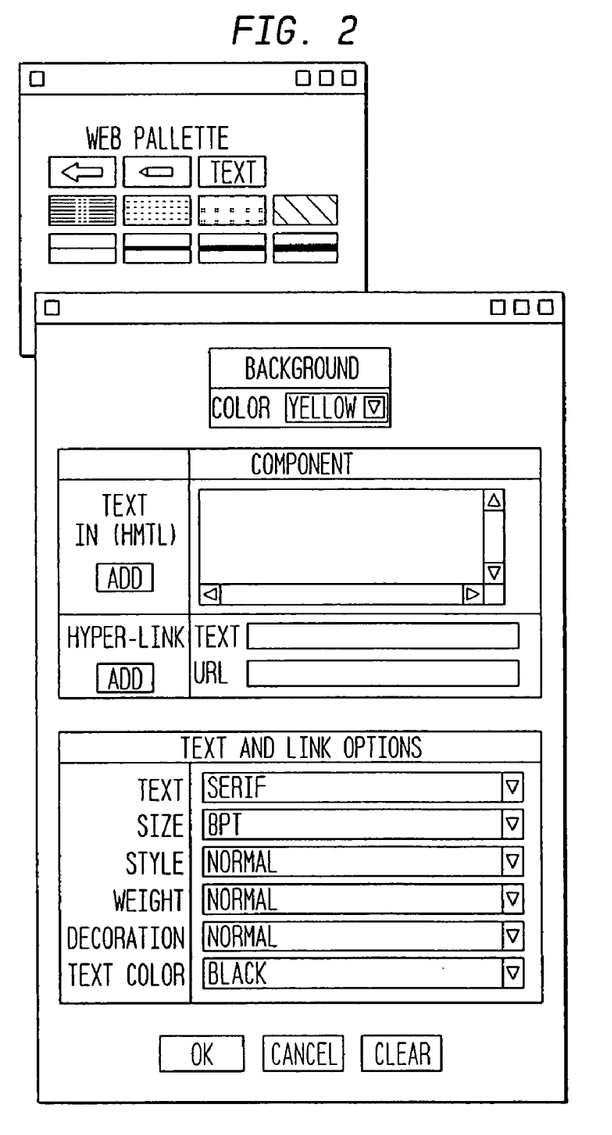
FIG. 2 is a drawing showing an example of a control panel for adding an object.
Figure 5:
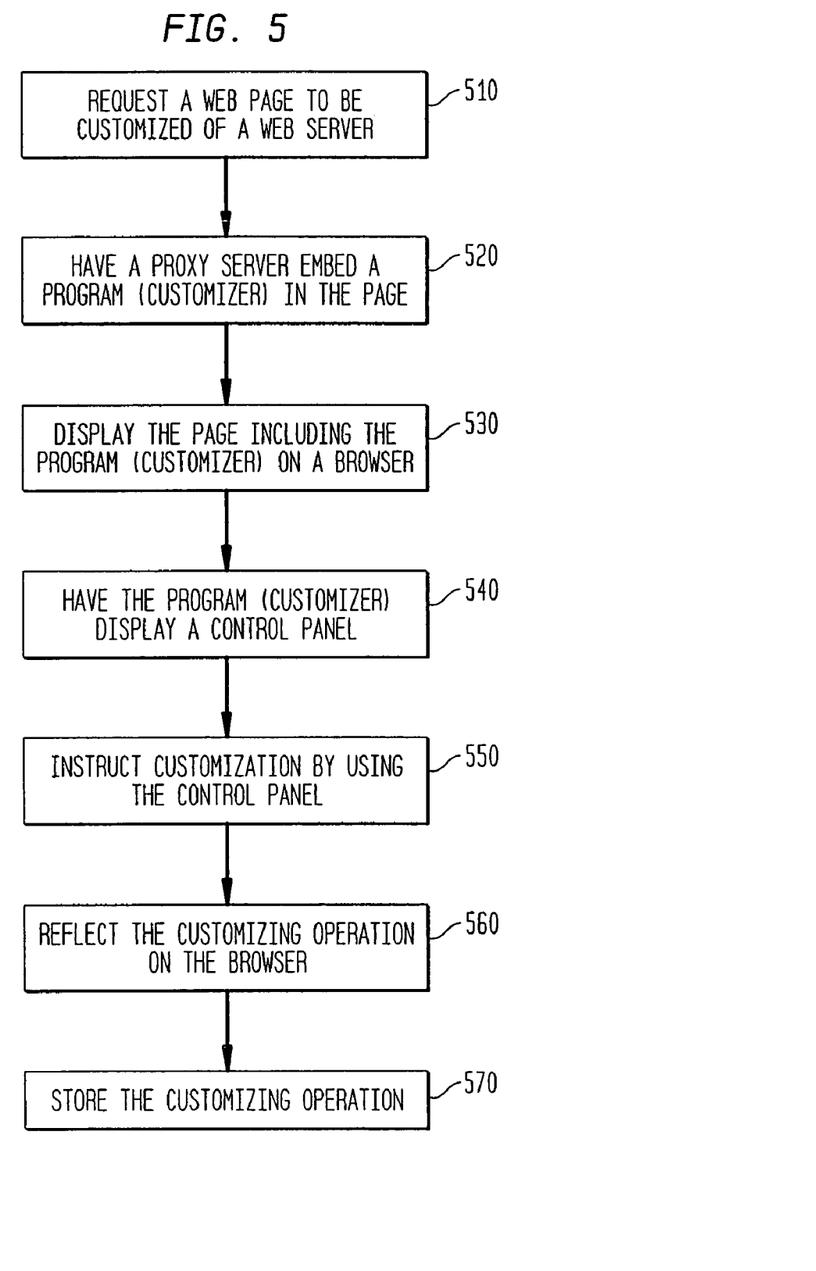
FIG. 5 is a flowchart up to completion of customization of a page.

FIG. 5 shows a flowchart up to completion of the customization of the present invention. First, in step 510, the user requests a Web page to be customized of a Web server by using a browser. It can be the same method as the one used when browsing an ordinary Web page and requires no special operation. Next, in step 520, a proxy server embeds a program (a customizer) in an HTML file. A customizer is entirely written in Java and JavaScript. In step 540, the browser displays a page including the customizer. In step 540, the customizer displays a control panel. The control panel in FIG. 2 is a user interface which accepts a designation of a customizing operation by the user. Next, in step 550, the user performs a customizing operation by using the control panel. For instance, pasting a new image on the page, or adding a new hyperlink. And an step 560, the customizer immediately reflects a customizing operation designated by the user on the browser. DHTML functions are used for reflecting it on the page. Lastly, in step 570, the customizer saves the customizing operation of the user. It can be saved either in a file on a local disk or in a database of the server. However, to share a customizing operation with members of a group, it needs to be saved in the database of the server.

Figure 6:
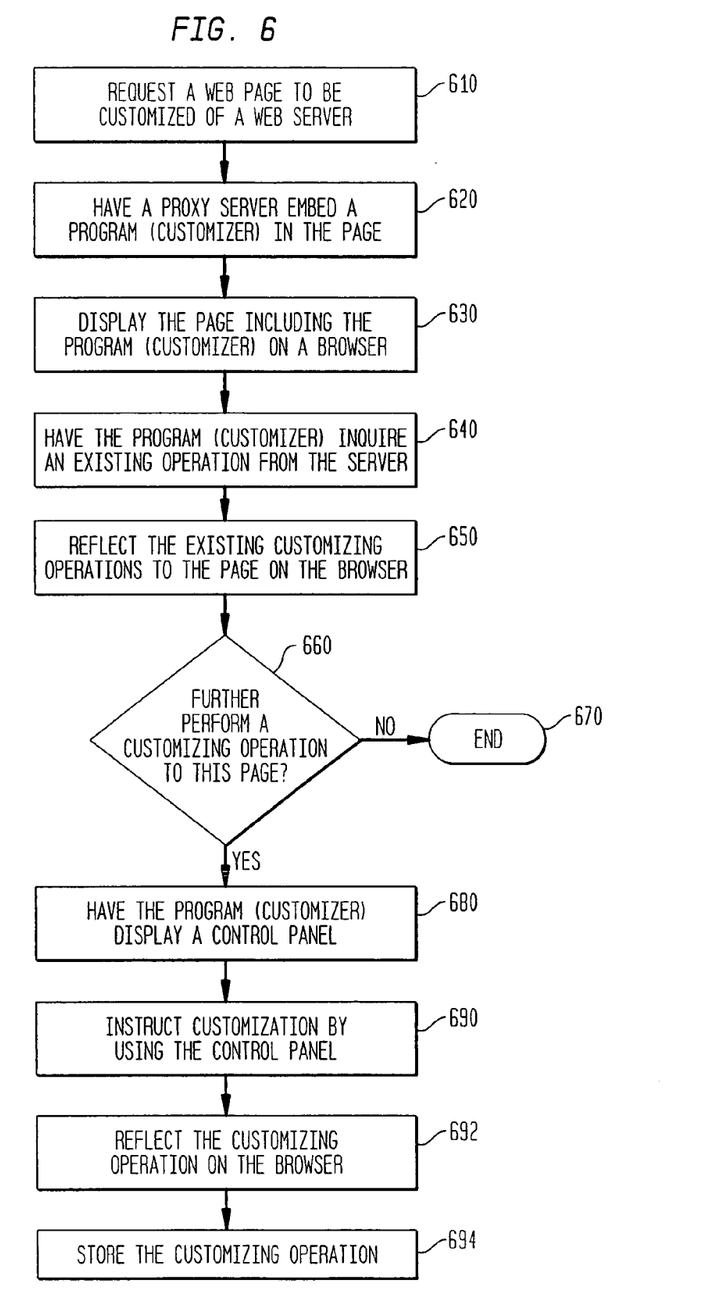
FIG. 6 is a flowchart in which, after customization is completed, users share it to perform editing work.

FIG. 6 shows a flowchart in which, after customization is completed, users share it to perform editing work. First, in step 610, the user requests a web page to be customized of a Web server by using a Web browser. It can be the same method as the one used when browsing an ordinary Web page and requires no special operation. Next, in step 620, a proxy server embeds a customizer in an HTML file. In step 630, the browser displays a page including the customizer. At this point, the page before customization is displayed on the browser. In step 640, the customizer immediately sends information such as a URL to the server and received the data of a customizing operation already performed on this page. In step 650, the customizer reflects existing operations on the browser based on the received data. At this point, the page after customization is displayed on the browser. In step 660, the user can not only browse the customized page but further customize it. In the case of further customizing it, the process moves on to step 680, an in the case of only browsing it, to step 670, and the customization ends. In step 680, the customizer displays a control panel. In step 690, the user performs a customizing operation by using the control panel. For instance, pasting a new image on the page, or adding a new hyperlink. In step 692, the customizer immediately reflects a customizing operation designated by the user on the browser. DHTML functions are used for reflecting it on the page. Lastly, in step 694, the customizer saves the customizing operation of the user in the database on the server.

A method for customizing a Web page on a browser is described further in detail. There are the following three operations for customizing a Web page on a browser.

Addition of an object

Change of an attribute of an object

Erasure of an object

A user designates what change is to be made through a control panel (see FIGS. 1 and 2). Reflection of a designated change on a browser is implemented by JavaScript, and the customizing operations are saved by Java applet on a local disk or sent to a server and saved on the server. Accordingly, to customize it, it is necessary to download a Web page in which JavaScript and Java applet are embedded. The JavaScript and Java applet which are embedded are called customizer. FIG. 1 shows, when downloading from a Web server an HTML file to be customized, how a customizer is embedded and passed to the browser. In customizing work, a user designates what change should be made by using a control panel. At this time, the control panel is provided by the customizer. As FIG. 1 shows, a browser window can be used as a control panel, or a window can be made in Java. The change designated by the user is passed to the customizer, and the customizer reflects it on an HTML document on the browser by using DHTML functions. The following describes methods for implementing each function of operations for customizing a Web page on a browser.

(i) Addition of an object

Figure 3:
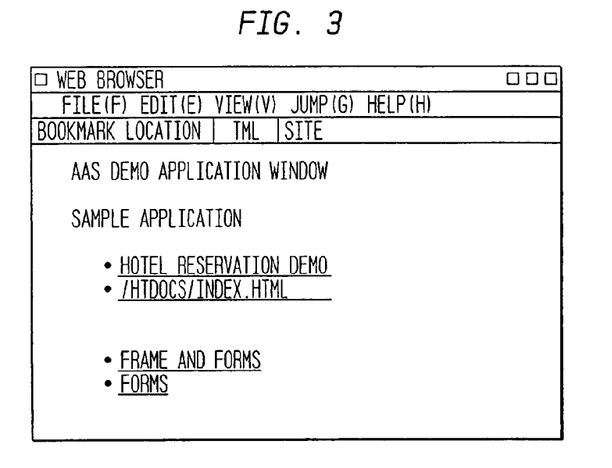
FIG. 3 is a drawing showing an example of an original Web page.
Figure 4:
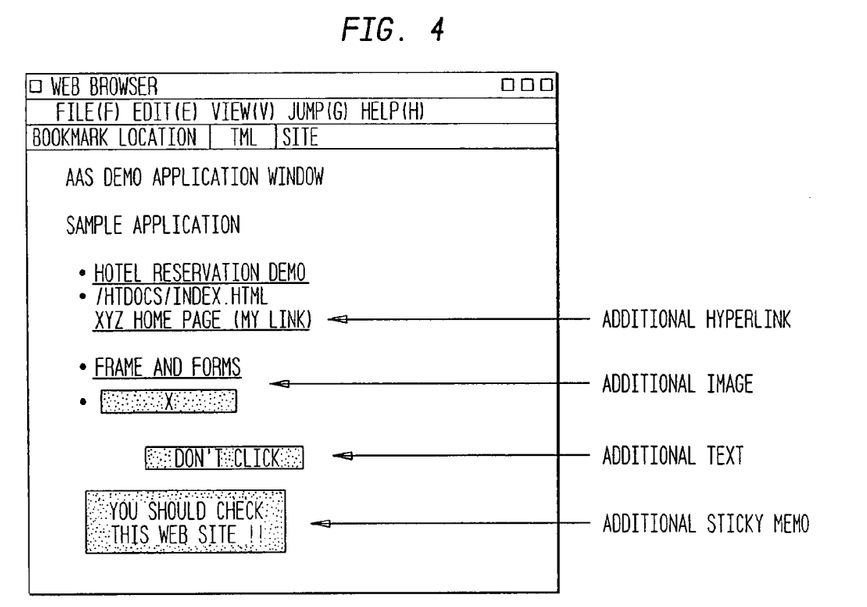
FIG. 4 is a drawing showing an example of adding text, a hyperlink, and an image to an original Web page.

FIG. 2 shows an example of implementation of a control panel for addition of an object. It becomes possible for a user, by using the control panel in FIG. 2, to add text and a hyperlink on a Web page. FIG. 3 also shows an original Web page. FIG. 4 shows an example of a Web page in which text, a hyperlink, and an image are added to the original Web page in FIG. 3. FIG. 4 shows the added hyperlink, added image, added text and a state in which text and a link are pasted like slips. Meanwhile, the added image is an example of hiding the last link so as not to be clicked.

(ii) Change of an attribute of an object

Attributes of an object include a link target of a hyperlink, a font, a size and a color of text. To change a link target, href property of a link object is modified.

(iii) Erasure of an object

To erase an object, a display property of an object can be changed so that it is no longer displayed. The method for displaying a customized Web page on a browser is described further in detail. To display a customized Web page, after reading an HTML file into a browser, DHTML functions are utilized to reflect contents of customization. When downloading an HTML file, a customizer (JavaScript and Java applet) is embedded by a proxy server. The customizer finds customizing operations saved in a local file of a server or a client machine by retrieving them with a URL and a user ID as keys. It obtains the customizing operations and examines what change has been made to the Web page so as to reflect the customizing operations on a Web page by utilizing DHTML functions. When storing an additional operation of an object in a database for customization, if only coordinates on a browser window of the added object are recorded, in the case that each user has different setting of a font, a character size or the like, there are cases where a display position of the added object is different from what an original user intended. This is because a line feed position of text or a placement of a drawing changes depending on setting of a browser. To solve this problem, it should be recorded which object on a Web document the additional object was added onto, so it becomes possible to correctly display it even when browsers vary in setting.

Moreover, as to the Web services such as online shopping, there are sites where a technology for dynamically generating a page by a Web server and switching a displayed advertisement for each customer is used. If such a personalized page is customized, and when another user sees that page, contents of the page may have changed and may not correctly reflect the customizing operation performed by the original user. To avoid such situation, there is a method for recording a last update data of a Web page simultaneously when storing information of a customizing operation in a database for customization. In this method, when a customizer reflects a customizing operation in (6) of FIG. 1, it can examine the last update date of the page and warn the user in case contents of the page at the time of the customizing operation may be different from those of the current page.

Figure 7:
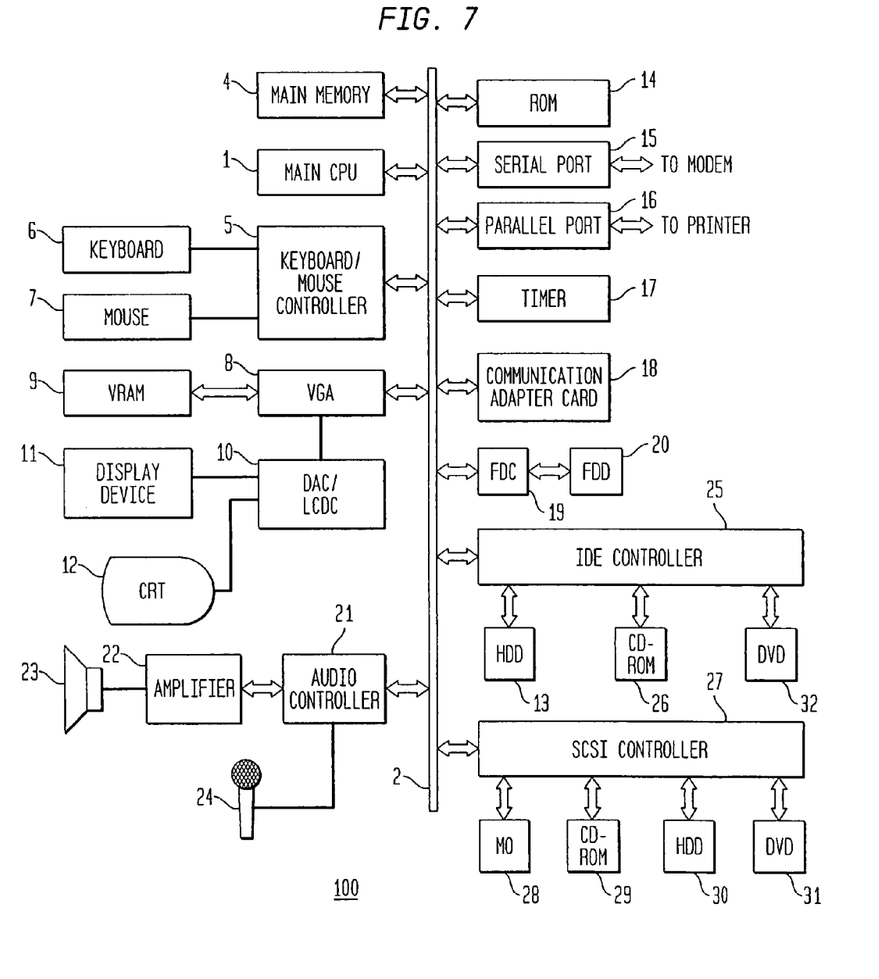
FIG. 7 shows an example of hardware configuration of a server and a computer for a user used in the present invention.

FIG. 7 shows an embodiment of hardware configuration of a server and a computer for a user used in the present invention. System 100 comprises a central processing unit (CPU) 1 and memory 4. CPU 1 and memory 4 are connected via bus 2, and by way of hard disk drive 13 (or a storage medium drive such as MO, CD-ROM 26 and DVD 32) and IDE controller 25 as auxiliary storage. Likewise, CPU 1 and memory 4 are connected via bus 2, and by way of hard disk drive 30 (or a storage medium drive such as MO 28, CD-ROM 29 and DVD 31) and SCSI controller 27 as auxiliary storage. Floppy disk drive 20 is connected with bus 2 via floppy disk controller 19. Preferably, a database for customization is stored in auxiliary storage.

A floppy disk is inserted into floppy disk drive 20, and a code or data of a computer program for giving instructions to a CPU and so on to interact with an operating system to implement the present invention can be recorded on this floppy disk and the like, hard disk drive 13 (or a storage media such as MO, CD-ROM and DVD) and ROM 14, which is executed by being loaded to memory 4. The computer program comprises applications including an OS and a browser and other programs. The code of this computer program can also be compressed or divided into two or more so as to be recorded on two or more media.

System 100 can further have user interface hardware and comprise pointing device (a mouse, a joystick or the like) 7 or keyboard 6 for entry and display 12 for providing a user with visual data. It is also possible to connect with a printer via parallel port 16 or connect with a modem via serial port 15. This system 100 is connected with a network via serial port 15 and a modem or communication adapter 18 (Ethernet or Token-ring card) or the like so as to communicate with other computers and so on. For instance, it communicates with a Web server, proxy server and the like. Furthermore, it is possible to connect a remote transmitter-receiver with serial port 15 or parallel port 16 so as to exchange data by means of an infrared ray or an electric wave.

Speaker 23 receives a speech signal which is D/A (digital/analog) converted by audio controller 21 via amplifier 22 and outputs it as speech. In addition, audio controller 21 makes it possible to A/D (analog/digital) convert speech information received from microphone 24 and capture into the system speech information outside the system.

Thus, it may be easily understood that a server or a computer for a user in the present invention is implementable by a communication terminal with a communication facility including an ordinary personal computer (PC) or a workstation, a notebook PC, a palmtop PC, a network computer, various household electrical appliances with a built-in computer such as a TV set, a game console with a communication facility, a telephone, a fax, a portable telephone, a PHS, an electronic organizer or combination of these. However, these components are taken as examples, and it does not follow that all of them are required components of the present invention.

The present invention enables a user to freely add and erase an object on an existing Web page without changing an original HTML file. It enables a user to change an attribute of an object on an existing Web page without changing an original HTML file. Since addition, erasure and change of an object are managed separately from an original HTML file, other users are not affected. In addition, it is no longer necessary to install software other than a browser on a client machine.

While the invention has been particularly shown and described with respect to preferred embodiments thereof, it will be understood by those skilled in the art that the foregoing and other changes in form and details may be made therein without departing from the spirit and scope of the invention.

The invention claimed is:

1. A computer-readable medium which comprises a program for enabling a user to customize original Web page, said program embedded in a requested Web page for implementing the functions of:

displaying on a client computer a control panel interface for said user, said control panel interface enabling a user to designate one or more web page customizing operations comprising: addition of an object, change of an attribute of an object or object erasure for the original Web page displayed to said user on a browser of the client computer;

based on a customizing operation designated by said user via said control panel, customizing the original Web page while said original Web page remains available for viewing and customizing by other users;

storing data pertaining to said customizing operation by said user, said data including one or more of a user ID of said user performing the customization, a URL of the customized page, and said customizing operations, wherein said program further retrieves the original Web page and stored customizing operations based on the URL and the User ID, and executes functions for customizing the original Web page based on the stored customizing operations; and, dynamically restoring said customized Web page using said customizing data when said original Web page is subsequently accessed by said user.

2. The computer-readable medium which comprises a program according to claim 1, wherein the step of customizing a Web page includes performing one or more customizing operations selected from the group comprising: adding an object, changing an attribute of an object or deleting an object.

3. A system for enabling a user to customize a Web page by using at least one client computer on which a browser for browsing a Web page runs, said system comprising:

means for enabling said user to request an original Web page for said user to customize;

means for embedding a customizing program in said requested original Web page, said customizing program to be executed by said user on said client computer;

means for said user to receive on said client computer said requested original Web page in which said program for customizing a page is embedded;

Web browser means for displaying on said client computer said received original Web page to said user;

means for executing said customizing program to display on said client computer for said user a control panel interface for enabling a user to designate one or more web page customizing operations comprising: addition of an object, change of an attribute of an object or object erasure;

means for customizing said original Web page according to a customizing operation designated by said user using said control panel interface while said original Web page remains available for viewing and customizing by other users; and, means for storing data pertaining to said customizing operation executed by said user, said means for storing data pertaining to said customizing operation including: storing one or more of a user ID of said user performing the customization, a URL of the customized page, and said customizing operations, wherein said customizing program further retrieves the original Web page and stored customizing operations based on the URL and the User ID, and executes functions for customizing the original Web page based on the stored customizing operations, wherein said customized Web page is dynamically restored using said customizing data when said original Web page is subsequently accessed by said user.

4. The system according to claim 3, wherein said means for requesting a Web page is a means for requesting a page from a Web server via a server or for requesting a locally stored Web page.

5. The system according to claim 3, wherein said means for storing data on a customizing operation is a means for storing said data on a server.

6. The system according to claim 5 wherein said system further comprises:

means for having another computer request a Web page to be customized;

means for having another computer receive said requested Web page in which a program for customizing a page is embedded;

means for having another computer display said received Web page by a browser;

means for having said program display a control panel interface for a customizing operation; and means for having said program, based on data of a customizing operation already performed on said Web page, reflect a customizing operation performed on said Web page on a browser.

7. The system according to claim 6 wherein said system further comprises the means for further customizing a Web page according to a customizing operation by a user using said control panel interface from said another computer.

8. The system according to claim 3, wherein said program is executable independent of any operating system or Web browser.

9. The system according to claim 3, wherein said system comprises a means for immediately reflecting a result of a customizing operation on a browser.

10. The system according to claim 3, wherein said customizing operation via said control panel includes one or more of: adding an object, changing an attribute of an object or deleting an object.

11. The system according to claim 10, wherein said customizing operation is performed without changing an existing Web server providing said original Web page or said Web browser.

12. A method for enabling a user to customize a Web page by using at least one client computer on which a browser for browsing a Web page runs, said method comprising the steps of:
  a) requesting an original Web page to be customized by said user;
  b) embedding a customizing program to be executed by said user in said requested original Web page;
  c) receiving said requested original Web page in which said program for customizing a Web page by said user is embedded;
  d) displaying to said user on said client computer said received original Web page by a browser;
  e) executing said customizing program to display a control panel interface on said client computer for said user, said control panel interface enabling a user to designate one or more web page customizing operations comprising: addition of an object, change of an attribute of an object or object erasure;
  f) customizing the received original Web page according to a customizing operation designated by said user using said control panel interface while said original Web page remains available for viewing and customizing by other users;
  g) storing data pertaining to said customizing operation by said user by storing one or more of a user ID of said user performing the customization, a URL of the customized page, and said customizing operations, wherein said customizing program further retrieves the original Web page and stored customizing operations based on the URL and the User ID, and executes functions for customizing the original Web page based on the stored customizing operations; and,
  h) dynamically restoring said customized Web page using said customizing data when said original Web page is subsequently accessed by said user.

13. The method according to claim 12, wherein the step (a) of requesting a Web page is a step of requesting a page from a Web server via a server or of requesting a locally stored Web page.

14. The method according to claim 12, wherein the step (f) of storing data on a customizing operation includes storing said data on a server.

15. The method according to claim 14 wherein said method further comprises the steps of:
  having another computer request a Web page to be customized;
  having another computer receive said requested Web page in which a program for customizing a page is embedded;
  having another computer display said received Web page by a browser;
  having said program display a control panel for a customizing operation; and
  having said program, based on data of a customizing operation already performed on said Web page, reflect a customizing operation performed on said Web page on a browser.

16. The method according to claim 15 wherein said method further comprises the step of: further customizing a Web page according to a customizing operation by a user using said control panel from said another computer.

17. The method according to claim 12, wherein said program is described in a program not dependent on any operating system nor browser.

18. The method according to claim 12, wherein the step e) of customizing a Web page includes performing one or more customizing operations selected from the group comprising: adding an object, changing an attribute of an object or deleting an object.

* * * * *